United States Patent

Arand

[15] 3,670,501

[45] June 20, 1972

[54] GAS TURBINE ENGINE WITH IMPROVED AFTERBURNER

[72] Inventor: John K. Arand, Palos Verdes Peninsula, Calif.

[73] Assignee: General Electric Company

[22] Filed: June 29, 1970

[21] Appl. No.: 50,415

[52] U.S. Cl. ...................... 60/261, 60/39.72 R, 60/39.74 R
[51] Int. Cl. ......................................................... F02k 3/10
[58] Field of Search ...................... 60/261, 39.72 R, 39.74 R

[56] References Cited

UNITED STATES PATENTS

| | | | |
|---|---|---|---|
| 2,714,287 | 8/1955 | Carr | 60/261 X |
| 2,934,891 | 5/1960 | Brown | 60/261 |
| 2,975,589 | 3/1961 | Vdoviak | 60/261 |
| 3,056,261 | 10/1962 | Krabacher et al | 60/261 X |
| 3,315,468 | 4/1967 | Vdoviak | 60/39.72 |

FOREIGN PATENTS OR APPLICATIONS

| | | | |
|---|---|---|---|
| 821,286 | 10/1959 | Great Britain | 60/39.72 |

*Primary Examiner*—Allan D. Hermann
*Attorney*—Derek P. Lawrence, Frank L. Neuhauser, Oscar B. Waddell, Joseph B. Forman and Edward S. Roman

[57] ABSTRACT

The disclosure shows an afterburner for a gas turbine engine comprising fuel injectors and concentric, annular, V-shaped gutters which function as flameholders. The fuel injectors are mounted in cantilever fashion from a casing and their inner ends are connected by links to a ring to damp vibrations.

3 Claims, 5 Drawing Figures

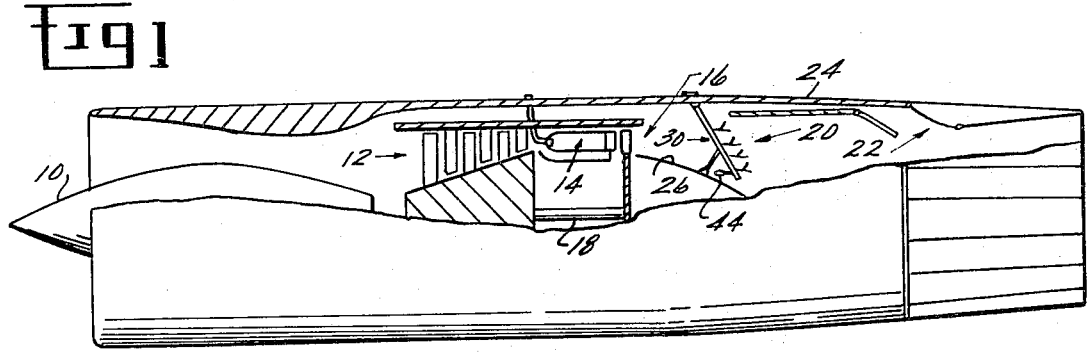
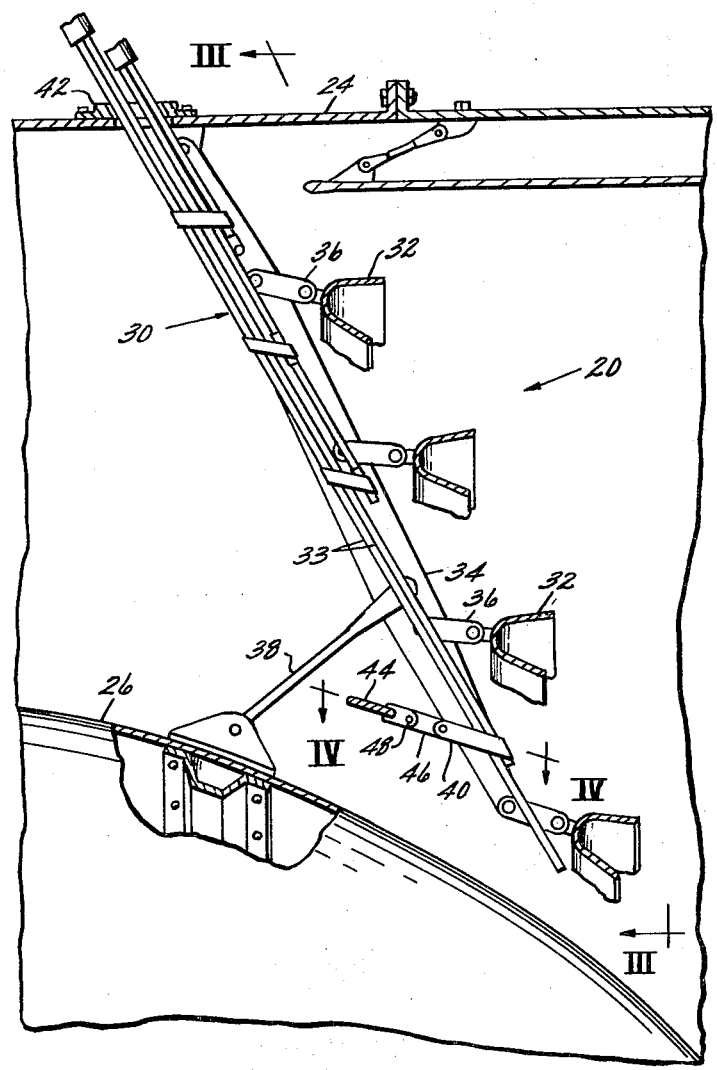

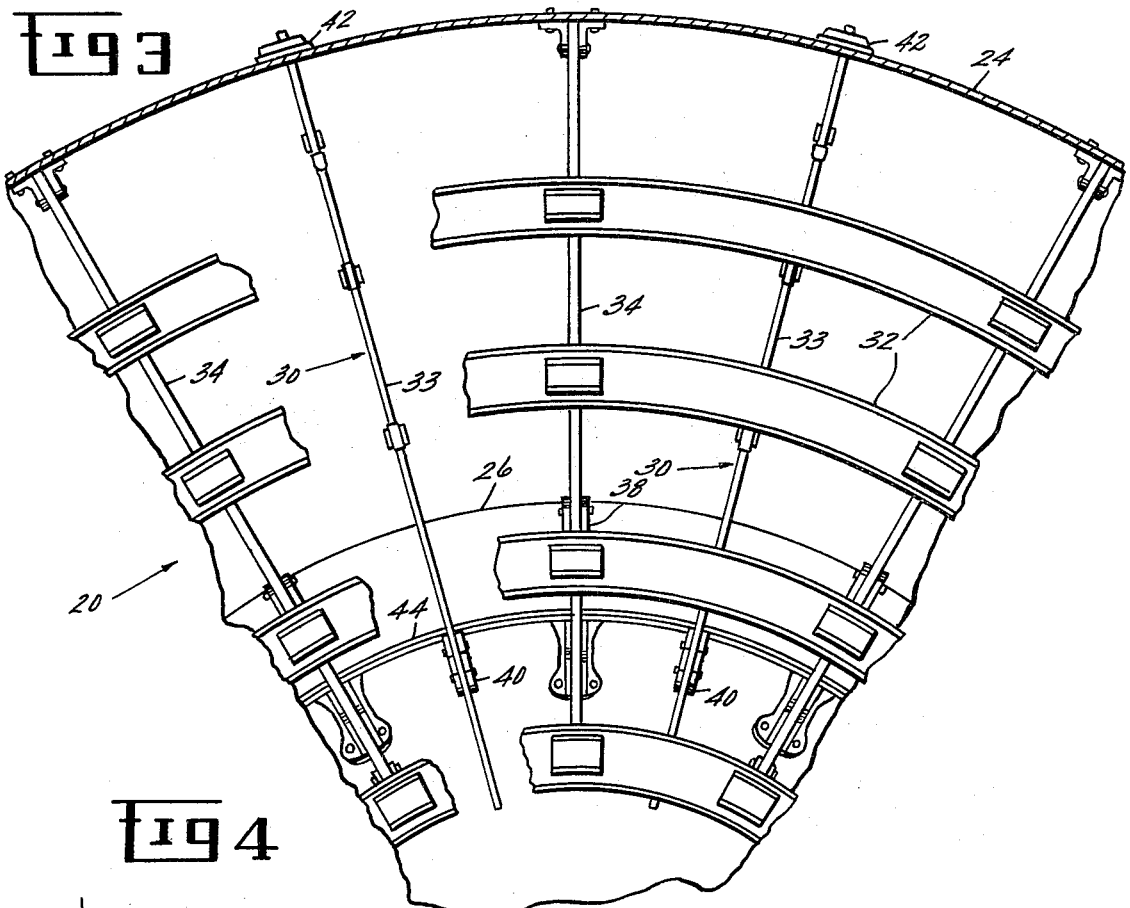
Fig 3
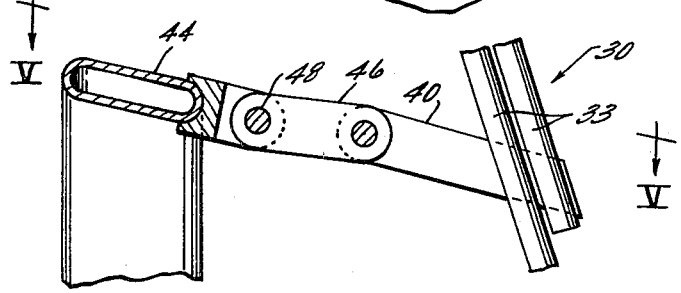
Fig 4
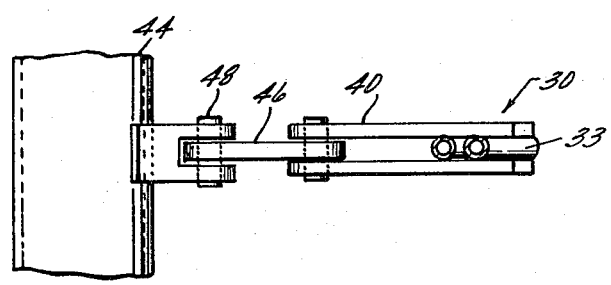
Fig 5
INVENTOR.
JOHN K. ARAND
ATTORNEY

GAS TURBINE ENGINE WITH IMPROVED AFTERBURNER

The invention described and claimed in the United STates patent application herein resulted from work done under United States Government contract FA-SS-66-6. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in gas turbine engines having afterburners for augmenting the energy level of a hot gas stream to be discharged from a propulsion nozzle.

In such afterburners, fuel is injected into a hot gas stream to increase, or augment, its energy level. Flameholders are mounted immediately downstream of the injectors to establish a stable flamefront or localized combustion zone for the augmenting fuel.

Afterburner fuel injectors are desirably elongated tubes or tube bundles mounted in cantilever fashion on an outer casing. Their length is necessitated by the need to distribute fuel through the full height of the annular stream. Because of their length and cantilever mounting, they have been particularly prone to induced vibration which can result in high stresses and premature failure. The desire for avoiding complexity and maintaining light weight motivates against the use of such obvious expedients as increased sizing of the injectors or supporting their opposite ends in overcoming this problem.

Accordingly, the object of the invention is to minimize vibration of afterburner fuel nozzles in a non-complex fashion involving minimum weight.

These ends are broadly attained by the use of a damper ring tied to the inner ends of cantilevered fuel injectors, preferably by linkage means.

The above and other related objects and features of the invention will be apparent from a reading of the following description of the disclosure found in the accompanying drawings and the novelty thereof pointed out in the appended claims.

In the drawings:

FIG. 1 is a schematic showing of a gas turbine engine incorporating an afterburner for supersonic propulsion;

FIG. 2 is a partial longitudinal section showing the afterburner in greater detail;

FIG. 3 is a section taken on line III—III in FIG. 2;

FIG. 4 is an enlarged section of a portion of FIG. 2; and

FIG. 5 is a section taken on line V—V in FIG. 4.

FIG. 1 schematically illustrates a gas turbine engine of the type employed for supersonic flight. Air enters an inlet comprising a spike 10 and is then compressed in an axial flow compressor 12. This compressed air supports combustion of fuel in a combustor 14 to generate a hot gas stream. The hot gas stream drives a turbine 16 which in turn, through a shaft 18, powers the rotor of the compressor 12. The energy level of the hot gas stream may then be augmented by the combustion of further fuel in an afterburner or augmenter 20. The augmented gas stream is then discharged from a variable area, convergent-divergent nozzle 22 to provide the necessary thrust for supersonic flight.

In subsonic flight operation, the hot gas stream may or may not be augmented in the afterburner and the nozzle may be adjusted to other than the illustrated convergent-divergent configuration.

Referencing FIGS. 2 and 3, it will be noted that the hot gas stream has an annular flowpath as it enters the afterburner. This flowpath is defined by an engine casing 24 and a central plug 26 which is supported on appropriate frame structure (not shown).

The afterburner includes fuel injectors 30 and flameholders in the form of annular V-shaped gutters 32. Each injector comprises a plurality of tubes 33 which are longitudinally aligned and progressively shorter in a downstream sense. Openings in the tubes spray fuel into the hot gas stream and a stabilized flamefront or combustion zone is maintained by the gutters 32. This type of an afterburner combustion mechanism is known per se.

The gutters 32 are mounted in a manner more fully described and claimed in my copending application, Ser. No. 40,298, filed May 25, 1970, and of common assignment with the present application. Briefly, each gutter 32 is connected to a plurality of angularly spaced beams 34 by links 36. The outer ends of the beams are pivotally mounted on the casing 24 with the links 38 pivotally connecting the inner ends of the beams to the casing 26.

The tubes 33 of each injector are held together by straps 40. The outer ends of the tubes 33 project beyond the casing 24 and are mounted thereon by a bracket 42. The outer ends of the tubes 33 are connected to a suitably controlled source of pressurized fuel.

The injectors 30 thus project in cantilever fashion, angled in a downstream direction, from the casing. The inner ends of these injectors are tied together by a damping ring 44. More specifically, the inner tie straps 40 are extended in an upstream direction to pivotally mount links 46 on pins 48. The opposite ends of the links 46 are pivotal on pins 50 which are mounted on lugs 52 projecting from the ring 44.

The damping means thus provided effectively prevents vibration being induced into the cantilevered fuel injectors. Further, this end is accomplished with a minimum of weight and complexity.

Various modifications of the preferred embodiment, herein described, will appear to those skilled in the art within the spirit and scope of the present inventive concepts which are to be derived solely from the following claims.

Having thus described the invention, what is claimed as novel and desired to be secured by Letters Patent of the United States is:

1. A gas turbine engine comprising an afterburner for increasing the energy level of a hot gas stream, said afterburner including
   an outer casing,
   a plurality of elongated fuel injectors mounted on said casing and projecting inwardly therefrom in cantilever fashion, said fuel injectors being angularly spaced around said casing, and
   means for damping said injectors including a ring tied to the several injectors adjacent their free, inner ends.

2. A gas turbine engine as in claim 2 wherein:
   the damping means includes a linkage connection between each injector and said ring.

3. A gas turbine engine as in claim 2 wherein:
   the injectors comprise a plurality of tubes aligned in a longitudinal direction with the tubes having a progressively shorter length in a downstream direction and straps holding the tubes in assembled relation and
   the linkage connections comprising upstream extensions of the inner injector straps, links pivotally mounted thereon, and lugs projecting downstream from said ring and pivotally receiving the upstream ends of said links.

* * * * *